Dec. 16, 1947.   G. E. MUZZY   2,432,922
ELECTRIC LAWN EDGER
Filed April 19, 1945
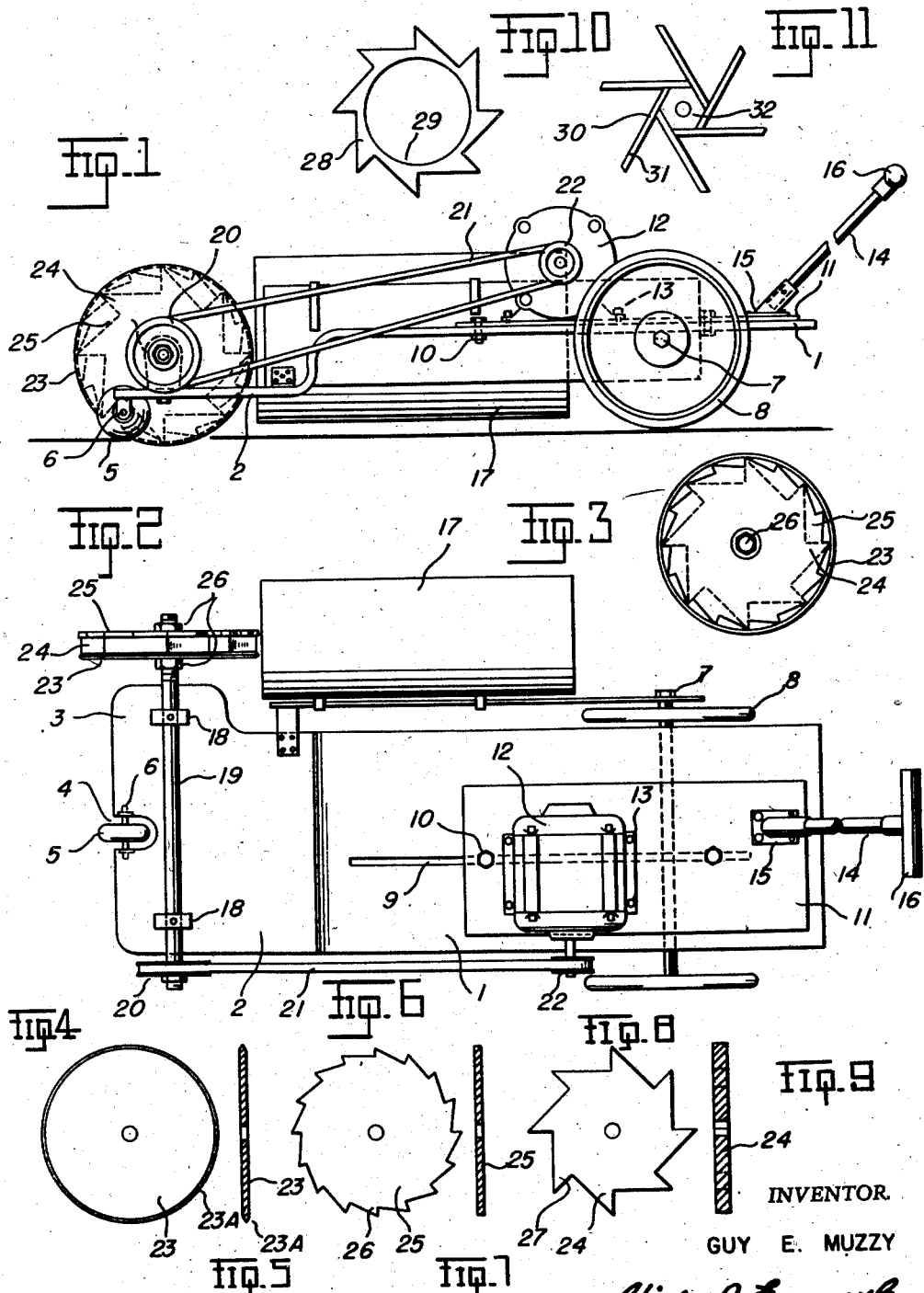
INVENTOR.
GUY E. MUZZY
BY Victor J. Evans & Co.
ATTORNEYS Patented Dec. 16, 1947

2,432,922

UNITED STATES PATENT OFFICE 2,432,922

ELECTRIC LAWN EDGER

Guy E. Muzzy, Oakland, Calif.

Application April 19, 1945, Serial No. 589,133

7 Claims. (Cl. 97—227)

My present invention in its broad aspect, has to do with improvements in lawn edging machines, and by that I mean powered devices having grass and dirt cutting means, means for cutting and cleaning along the edge of a sidewalk, and means for ditching between the grass plot and the sidewalk and excavating and gathering up the dirt and debris to the end that a clean job will be accomplished. My invention includes a wheeled base on which is adjustably and slidably mounted an electric motor support to which the handle of my device is attached. A grass and debris catcher and container is attached to the side of the base, and in the front of the base and in advance of the grass and debris catcher and container is mounted a shaft driven from the motor and which carries at its end three discs, one against the other; one disc being a beveled edged disc for trimming along a sidewalk, another disc being a toothed grass and dirt cutting disc, and the remaining disc located between the first two being the excavating and dirt throwing and scavenging disc for removing the dirt and debris from between the sidewalk or the like, and the edge of the trimmed grass plot and throwing or transferring such debris and dirt to the catcher and container. My device is simple in construction, may be easily regulated as to speed of operation by changing to different size of drive pulleys, is practical, sturdy and easily and economically operated.

Other and equally important objects and advantages of my invention will be apparent from the following description and drawings, and it is pointed out that changes in form, size, shape, materials, and construction and arrangement of parts is permissible and within the purview of my broad inventive concept, and the scope of the appended claims.

In the drawings, wherein I have illustrated a preferred form of my invention:

Figure 1 is a side view of my invention;

Figure 2 is a top plan view;

Figure 3 is a side view of my cutting disc and dirt throwing and excavating assembly;

Figure 4. view A, is a face view of the sidewalk trimming disc;

Figure 5 is a vertical sectional view of the sidewalk trimming disc;

Figure 6 is a face view of the grass and dirt cutting disc;

Figure 7 is a vertical sectional view of the grass and dirt cutting disc;

Figure 8 is a face view of the dirt throwing and excavating disc;

Figure 9 is a vertical sectional view of the dirt throwing and excavating disc;

Figure 10 is a face view of a modified form of dirt throwing and dirt excavating disc, and Figure 11 is a face view of another modified form of dirt throwing and dirt excavating disc.

In the drawings wherein like characters of reference are used to designate like or similar parts:

The numeral 1 designates the supporting base of my device which is formed of sheet metal and is elongated and curved downwardly and forwardly as at 2. The part 2 is extended laterally as at 3 and has a slot 4 between its side edges to receive a forward supporting roller or wheel 5 which is mounted on an axle 6. Near the back of the supporting base 1 is mounted an axle 7 on which rear traction or supporting wheels 8 are mounted. The base 1 is longitudinally slotted as at 9 to receive the attaching and adjusting bolts 10 of a motor supporting plate 11 to which a small electric motor 12 is bolted as at 13. A handle 14 rising upwardly and rearwardly at an angle is attached as at 15 to the plate 11 and has a cross hand grip 16 to propel and guide my device. Mounted on one side edge of the base 1 and to the axle 7 and back of the extension 3 is a cylindrical dirt, grass and debris receiving cylindrical container 17, and mounted on journal brackets 18 transversely of the part 2 of the base is a shaft 19 carrying a grooved pulley 20 at one one over which is trained a V-belt 21 from a grooved drive pulley 22 on the motor 12 to drive the shaft 19.

At the other end of the shaft are a beveled edge sidewalk trimming disc 23, a toothed dirt throwing and excavating disc 24, and a toothed dirt and grass cutting disc 25. These discs are mounted face to face in juxtaposition in the order named and are held in position as an operative unit by clamping nuts 26. As shown in Figures 4, 5, 6, 7, 8 and 9. the disc 23 is beveled and sharpened as at 23a; the disc 25 has cutting teeth 26, and the disc 24 is smaller in diameter than the discs 23 and 24 and has larger teeth 27 and is set between the discs 23 and 25 to dig into and excavate and throw the dirt to form a clean trench. The dirt is thrown into and received by the container 17 to make a clean job, and the disc 24 may be of a suitable thickness to give a trench of desired width.

In Figure 10, the excavating and dirt throwing disc 28 is in the form of a ring 29, and in Figure 11, the excavating and dirt throwing disc 30 has angular blades 31 attached to the faces of a hexagonal hub 32.

From the foregoing, it is believed that the operation and advantages of my invention will be apparent, but it is again pointed out that interpretation of the scope of my invention should only be conclusive when made in the light of the subjoined claims.

I claim:

1. A powered lawn edger, comprising a wheeled supporting base, a motor supporting plate slidably and adjustably mounted on the base, a handle on the plate, a dirt, grass and debris container mounted along one edge of the supporting base, a shaft journalled on the base transversely and in advance of the dirt container and operatively connected with the motor, and a plurality of discs mounted face to face and in juxtaposition at the end of the shaft in advance of the container, one of said discs being beveled to trim along a sidewalk, another disc having teeth to cut dirt and grass, and an intermediate disc between the first two discs formed to dig and throw dirt and debris to form a trench, said dirt and debris being received by the container.

2. The invention as defined in claim 1 wherein the supporting base has a downwardly and forwardly bent forward end, having a lateral extension, said shaft mounted on the said end and the cutting, trimming and ditching assembly mounted on the shaft at the end of the extension.

3. The invention as defined in claim 1 wherein the sidewalk trimming disc has a beveled edge, the dirt and grass cutting disc has cutting teeth, and the excavating disc functions as a spacer between the above two discs and is of less diameter and has a toothed edge, the teeth being larger than those of the grass cutting disc.

4. The invention as defined in claim 1 wherein the motor is fixed to the supporting plate in advance of the handle, and the motor is provided with a belt and pulley connection with the shaft.

5. The invention as defined in claim 1 wherein the base has a forward traction wheel, and two rear traction wheels to be moved over the ground.

6. The invention as defined in claim 1 wherein the excavating and dirt throwing disc is a ring having a toothed edge.

7. The invention as defined in claim 1 wherein the intermediate disc has a hexagonal hub, and angularly disposed blades fixed to the faces of the hub, the blades disposed with their inner ends abutting the face of the next adjacent blade.

GUY E. MUZZY.

REFERENCES CITED

The following references are of record in the file of this patent:

UNITED STATES PATENTS

| Number | Name | Date |
|---|---|---|
| 1,644,068 | McBride | Oct. 4, 1927 |
| 1,065,946 | Janson | July 1, 1913 |
| 2,361,637 | Lathrop | Oct. 31, 1944 |
| 2,273,120 | Lindskog | Feb. 17, 1942 |